United States Patent
Armangau et al.

(10) Patent No.: US 10,635,315 B1
(45) Date of Patent: Apr. 28, 2020

(54) PERFORMING COMPRESSION AND DEDUPLICATION AT DIFFERENT GRANULARITIES

(71) Applicant: EMC IP Holding Company LLC, Hopkinton, MA (US)

(72) Inventors: Philippe Armangau, Acton, MA (US); Vamsi K. Vankamamidi, Hopkinton, MA (US); Steven A. Morley, Mendon, MA (US); Daniel E. Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/361,338

(22) Filed: Mar. 22, 2019

(51) Int. Cl.
 *G06F 3/06* (2006.01)

(52) U.S. Cl.
 CPC .......... *G06F 3/0608* (2013.01); *G06F 3/0641* (2013.01); *G06F 3/0659* (2013.01); *G06F 3/0661* (2013.01); *G06F 3/0673* (2013.01)

(58) Field of Classification Search
 CPC combination set(s) only.
 See application file for complete search history.

(56) References Cited

U.S. PATENT DOCUMENTS

| | | | |
|---|---|---|---|
| 5,990,810 A | 11/1999 | Williams | |
| 8,799,601 B1 | 8/2014 | Chen et al. | |
| 9,569,455 B1 | 2/2017 | Bono et al. | |
| 9,779,023 B1 | 10/2017 | Armangau et al. | |
| 9,985,649 B1 | 5/2018 | Bassov et al. | |
| 10,037,336 B1 | 7/2018 | Hu et al. | |
| 2011/0238635 A1 | 9/2011 | Leppard | |
| 2016/0188622 A1 | 6/2016 | Sharangpani | |
| 2016/0246799 A1* | 8/2016 | Constantinescu | G06F 16/1748 |
| 2018/0039442 A1 | 2/2018 | Shadrin et al. | |
| 2018/0329631 A1 | 11/2018 | Swift | |

FOREIGN PATENT DOCUMENTS

WO 20150199574 12/2015

OTHER PUBLICATIONS

Armangau, Philippe, et al.; "Techniques for Efficiently Organizing Storage of Compressed Extents," U.S. Appl. No. 15/966,878, filed Apr. 30, 2018.
Armangau, Philippe, et al.; "Deduplicating Data At Sub-Block Granularity," U.S. Appl. No. 16/176,729, filed Oct. 31, 2018.
Armangau, Philippe, et al.; "Inline Deduplication of Compressed Data," U.S. Appl. No. 14/980,944, filed Dec. 28, 2015.

(Continued)

*Primary Examiner* — Yong J Choe
(74) *Attorney, Agent, or Firm* — BainwoodHuang

(57) ABSTRACT

A technique for promoting storage efficiency in a data storage system decouples data-set sizes used for compression from those used for deduplication, by performing deduplication at extent-level granularity but performing compression on aggregates that contain multiple extents. Compression and deduplication can each work on data-set sizes that are more optimal for the respective features, thereby avoiding the need to settle on a compromise that is not particularly well-suited to either of them.

19 Claims, 5 Drawing Sheets

(56) References Cited

OTHER PUBLICATIONS

Armangau, Philippe, et al.; "Speeding De-Duplication Using a Temporal Digest Cache," U.S. Appl. No. 15/668,388, filed Aug. 3, 2017.
Armangau, Philippe, et al.; "Speeding Deduplication Using a Most Wanted Digest Cache," U.S. Appl. No. 15/799,117, filed Oct. 31, 2017.
"Framework for Inline Compression Performance Assessment," U.S. Appl. No. 15/281,252, filed Sep. 30, 2016.
Ilya Usvyatsky, et al.; "Techniques for De-Duplicating Data Storage Systems Using a Segmented Index," U.S. Appl. No. 15/394,376, filed Dec. 29, 2016.
Ivan Bassov, et al.; "Compressing Data in Line Using Weighted ,Compression Budgets," U.S. Appl. No. 15/392,639, filed Dec. 28, 2016.
Ivan Bassov; "Tool for Selectively Deploying Inline Compression," U.S. Appl. No. 15/966,584, filed Apr. 30, 2018.
King, J., "The Bin Packing Problem," Ardrey Kell High School Website, Sep. 19, 2012, 5 pages, retrieved from http://mrking.cmswiki.wikispaces.net/file/detail/BinPacking.docx on Apr. 26, 2018.
Philippe Armangau, et al.; "Compression of Host I/O Data in a Storage Processor of a Data Storage System With Selection of Data Compression Components Based on a Current Fullness Level of a Persistent Cache," U.S. Appl. No. 15/957,065, filed Apr. 19, 2018.
Philippe Armangau, et al.; "Managing Inline Data Compression in Storage Systems," U.S. Appl. No. 15/393,443, filed Dec. 29, 2016.
Philippe Armangau, et al.; "Overwriting Compressed Data Extents," U.S. Appl. No. 15/499,206, filed Apr. 27, 2017.
Soumyadeep Sen, et al.; "Unaligned IO Cache for Inline Compression Optimization," U.S. Appl. No. 15/884,739, filed Jan. 31, 2018.
Yaming Kuang, et al.; "Recovering Compressed Data to Reduce Data Loss," U.S. Appl. No. 15/395,968, filed Dec. 30, 2016.
Yining Si, et al.; "Inline Compression With Small-Write Compression Avoidance," U.S. Appl. No. 15/662,676, filed Jul. 28, 2017.
Yining Si, et al.; "Write Tagging for Selective Avoidance of Inline Compression," U.S. Appl. No. 15/499,467, filed Apr. 27, 2017.

\* cited by examiner

PERFORMING COMPRESSION AND DEDUPLICATION AT DIFFERENT GRANULARITIES

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems support data compression and/or deduplication for promoting storage efficiency. Compression works by reducing the size of data sets so that they consume less storage space on disk. Storage systems may perform compression in hardware, in software, or via a mixed hardware/software approach. Deduplication works by replacing redundant data with pointers to a single retained copy (or a smaller number of such copies). In a typical deduplication scheme, a data storage system maintains a database that associates digests (e.g., hash values) of stored data blocks with corresponding pointers to locations of those data blocks in the system. When a new data block arrives or is fetched from disk, the storage system computes a digest of the new data block and attempts to match the new digest to one already stored in the database. If a match is found, the data storage system configures pointer metadata for the new data block so that it points to the previously-stored data pointed to by the matching entry in the database. Both compression and deduplication may be performed in the background, e.g., using a background process that works on already-stored data, or inline with data writes, such that newly arriving data blocks are compressed and/or deduplicated upon arrival.

SUMMARY

Although data storage systems may combine data compression with data deduplication to achieve high levels of storage efficiency, the two features can sometimes come into conflict. For example, compression ratios generally increase with larger data sets, as larger data sets provide more opportunities to find redundancies, whereas deduplication efficiencies generally decrease with larger data sets, as the likelihood of finding exact matches gets smaller. Thus, the data-set size that works best for compression does not usually work best for deduplication, and vice-versa. As a result, some compromise size for data sets is generally used, which fails to optimize either compression or deduplication.

In contrast with prior approaches, an improved technique for promoting storage efficiency in a data storage system decouples data-set sizes used for compression from those used for deduplication, by performing deduplication at block-level granularity but performing compression on aggregates that contain multiple blocks. Advantageously, compression and deduplication can each work on data-set sizes that are more optimal for the respective features, thereby avoiding the need to settle on a compromise that is not particularly well-suited to either of them. Higher levels of storage efficiency can thereby be achieved.

Certain embodiments are directed to a method of managing data storage in a computerized system that stores data within blocks. The method includes grouping blocks into aggregates, where each aggregate includes at least two blocks and the blocks have a common block size. The method further includes performing data deduplication at block-level granularity, which includes matching new blocks to already-stored blocks in the computerized system, and performing data compression at aggregate-level granularity by compressing all blocks within each aggregate together as a single data set.

Other embodiments are directed to a computerized system constructed and arranged to perform a method of managing data storage, such as the method described above. Still other embodiments are directed to a computer program product. The computer program product stores instructions which, when executed on control circuitry of a computerized system, cause the computerized system to perform a method of managing data storage, such as the method described above.

In some examples, performing data deduplication includes providing a digest database that relates digests of blocks to respective locations of those blocks in the computerized system. In such examples, matching new blocks to already-stored blocks includes computing a digest of a new block and performing a lookup into the digest database for the computed digest.

In some examples, access is provided to the blocks using mapping metadata that includes (i) pointer arrays and (ii) virtualization structures. Each pointer array includes a respective set of pointers, and each pointer points to a respective virtualization structure that points in turn to a respective block.

In some examples, a virtualization structure that points to a particular block includes a pointer to a particular aggregate that includes the particular block. The particular block has been compressed as part of a data set that includes all blocks grouped together within the particular aggregate.

According to some examples, the virtualization structure that points to the particular block includes tracking metadata that identifies the particular block within the particular aggregate.

According to some examples, the tracking metadata includes an index and a length. The index identifies a position of the particular block among all of the blocks within the particular aggregate, and the length indicates an uncompressed size of the particular aggregate.

In some examples, the uncompressed size of the particular aggregate in the tracking metadata is provided as an integer number of blocks.

In some examples, an upper limit is enforced on a number of blocks that are grouped together in a single aggregate. The upper limit may correspond to 32 kB (kilobytes) per aggregate, according to some variants, and the upper limit may be adjustable dynamically based upon system load.

According to some variants, the upper limit is further adjustable dynamically based upon at least one of the following: a compression algorithm used to compress aggregates and/or whether blocks stored within an aggregate correspond to logically contiguous data.

In some examples, grouping blocks into aggregates includes placing a set of blocks having contiguous logical offsets into contiguous positions within an aggregate.

In some examples, the system receives a read request, which is directed to a specified logical address of the particular block, and responds by: accessing a pointer array that maps the specified logical address; following a pointer in the accessed pointer array to the virtualization structure provided for the particular block; reading the particular aggregate pointed to by the virtualization structure; decompressing the particular aggregate; applying the tracking metadata within the virtualization structure to locate the particular block within the particular aggregate; and returning the particular block to satisfy the read request.

According to some examples, the digest database stores the respective locations of the blocks by identifying virtualization structures that point to the respective blocks in the computerized system.

According to some examples, a reference count is provided for the virtualization structure that points to the particular block. The reference count tracks a number of pointers in the pointer arrays that point to the virtualization structure based at least in part on having performed deduplication to the particular block.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for promoting storage efficiency in a data storage system decouples data-set sizes used for compression from those used for deduplication, by performing deduplication at block-level granularity but performing compression on aggregates that may contain multiple blocks.

Figure 1:
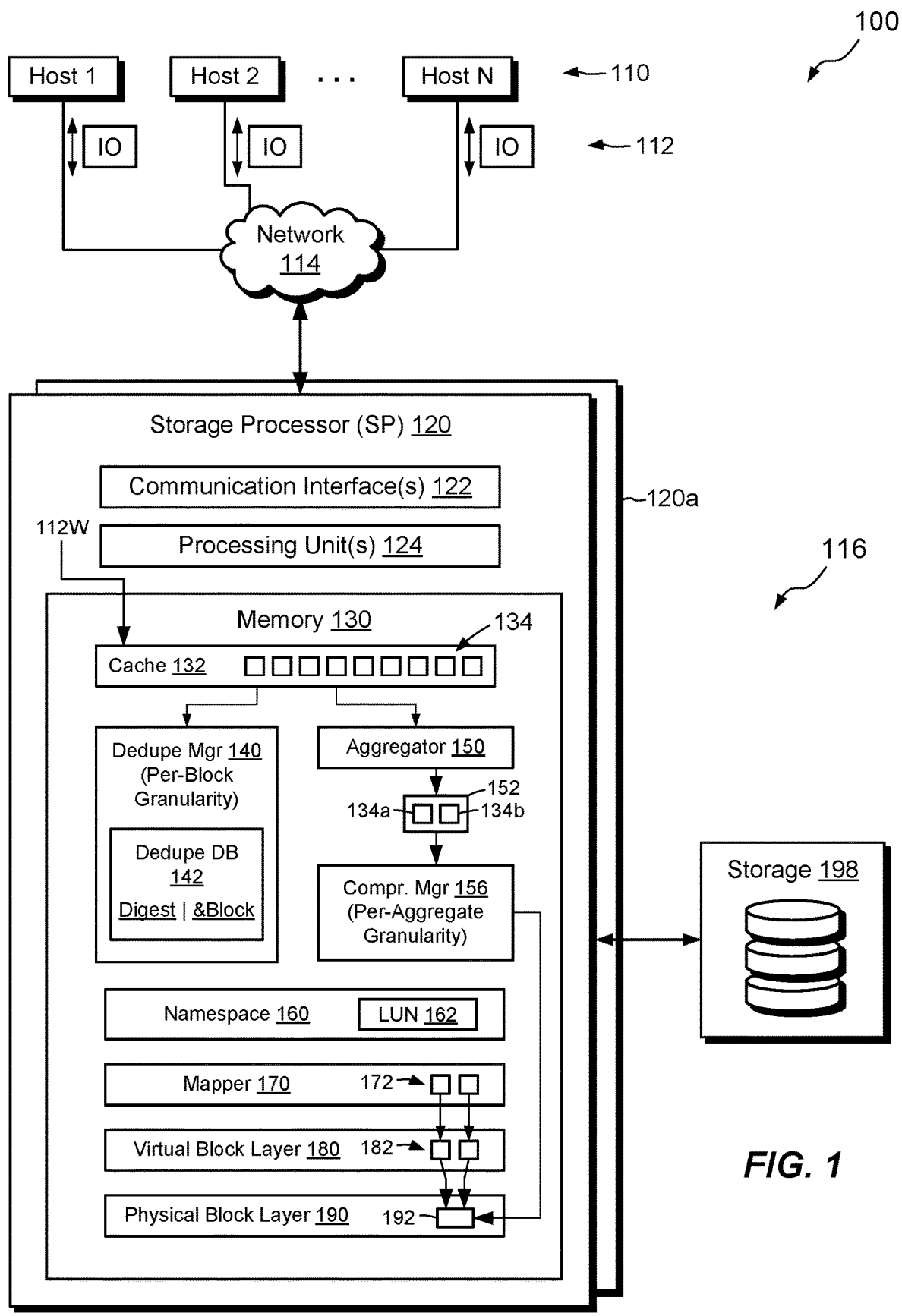
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes a storage processor, or "SP," 120 and storage 198, such as magnetic disk drives, electronic flash drives, optical drives, and/or the like. The data storage system 116 may include multiple SPs (e.g., a second SP 120a). In some examples, the SP 120 is part of a storage cluster that contains any number of storage appliances, where each appliance includes a pair of SPs connected to shared storage. In some arrangements, a host application runs directly on the SP (or SPs), such that separate host machines 110 need not be present. No particular hardware configuration is required, however, as any number of SPs may be used, including a single SP, in any arrangement, and the SP 120 may be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 198.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 may include many other software components, which are not shown, such as an operating system, various applications, processes, and daemons.

As further shown in FIG. 1, the memory 130 "includes," i.e., realizes by execution of software instructions, a cache 132, a deduplication ("dedupe") manager 140, an aggregator 150, and a compression manager 156. The cache 132 is configured to receive host data, i.e., data being written to the data storage system 116 by hosts 110, and to temporarily store the host data until it can be placed in proper structures. In some examples, the cache 132 is a persistent cache, such as one constructed from battery-backed and/or mirrored DRAM (Dynamic Random Access Memory). The cache 132 arranges host data in block-sized increments, or simply "blocks" 134, where a "block" is a logical unit of storage. In the illustrated example, a block is also an allocation unit used by the storage system, although this is not required. Blocks may be uniform in size, with 4-kB or 8-kB block sizes being common. Some storage systems may support multiple block sizes.

The dedupe manager 140 is configured to operate at per-block granularity. As shown, the dedupe manager 140 includes a dedupe database 142 that relates digests (e.g., hash values) of data blocks to locations ("&Block") of the respective data blocks in the data storage system 116. To perform deduplication on a new block, e.g., one that has arrived from a host 110 or which has been fetched from storage 198, the dedupe manager 140 computes a digest of the new block and performs a lookup into the dedupe database 142 for an entry whose digest matches the digest just computed for the new block. If a match is found, the dedupe manager 140 adjusts mapping structures within the data storage system 116 so as to direct a logical address of the new block to the block whose location is referenced by the matching entry. In this fashion, duplicate storage of the new data block can be avoided. If no match is found, the dedupe manager 140 may create a new entry in the dedupe database 142 for the new block. Preferably, the dedupe manager 140 is configured to compute digests with a high level of entropy such that a digest match virtually guarantees a block match.

The aggregator 150 is configured to group together blocks 134 stored in cache 132, thereby creating larger structures referred to herein as "aggregates." Each aggregate includes two or more blocks 134, and different aggregates may have different sizes, reflecting different numbers of blocks grouped together. In the example shown, aggregate 152 has two blocks 134a and 134b. In some examples, aggregator 150 is configured to group together blocks that have contiguous logical addresses, although this is not required. For example, aggregator 150 may group together blocks that have no logical relationship to one another.

In contrast with the dedupe manager 140, which is configured to operate at per-block granularity, the compression manager 156 is configured to operate at per-aggregate granularity, i.e., by compressing all blocks that are grouped together in each aggregate as a single data set. Thus, for example, when compressing the aggregate 152, compression manager 156 avoids separately compressing blocks 134a and 134b individually, but instead operates on the aggregate 152 as a whole. Performing compression at per-aggregate granularity leverages the tendency of larger data sets to produce higher compression ratios than do smaller data sets and thus promotes overall compression efficiency.

As further shown in FIG. 1, the memory 130 includes various structures for organizing host data, such as namespace 160, mapper 170, virtual block layer 180, and physical block layer 190. The namespace 160 is a logical structure configured to organize host-accessible data objects, such as LUNs (Logical UNits), file systems, virtual machine disks, and the like. A single LUN 162 is shown, but the namespace 160 may organize any number of data objects. The namespace 160 is also configured to track logical addresses of data objects, such as offsets into LUNs or file system addresses. Thus, for example, if LUN 162 were to have a maximum size of 10 GB (Gigabytes), then the namespace 160 would provide a 10-GB logical address range to accommodate the LUN 162.

Mapper 170 is configured to map logical addresses in the namespace 160 to virtualization structures in the virtual block layer 180. To this end, mapper 170 may include pointer arrays 172, e.g., arrays of indirect pointers, which may form multi-layer trees of pointers. For example, a pointer array 172 may include a pointer to a child pointer array and may be pointed to by a parent pointer array.

Virtual block layer 180 is configured to provide block virtualization for supporting deduplication. For example, leaf (lowest level) pointer arrays 172 in the mapper 170 point to virtualization structures 182 in the virtual block layer 180. Each virtualization structure 172 points to data in the physical block layer 190, such as compressed aggregate 192. In accordance with improvements hereof, multiple virtualization structures 182 may point to the same compressed aggregate, which may store the compressed data of multiple blocks.

Physical block layer 190 is configured to store physical blocks, which may include compressed aggregates as well as individually compressed blocks and/or uncompressed blocks. Although we describe the physical block layer 190 as "physical," this is merely a convention, as storage 198 is typically responsible for actual, physical storage of host data.

In example operation, hosts 110 issue I/O (Input/Output) requests 112 to the data storage system 116. The SP 120 receives the I/O requests 112 at the communication interfaces 122 and initiates further processing. Some of the I/O requests specify writes 112W of data to specified data objects hosted by the data storage system 116, such as LUNs, file systems, virtual machine disks, and the like. Each such write request 112W is directed to a respective logical address, such as a LUN and offset, a file system identifier and an offset into a particular file, and so on. The cache 132 receives the data specified in the write requests 112W and organizes the data in blocks 134. Some of the data arriving into the cache 132 may be contiguous, meaning that the data are directed to contiguous logical addresses in the namespace 160, and other data may be random, meaning that consecutively arriving blocks are not logically contiguous and may indeed relate to different data objects altogether.

Aggregator 150 aggregates blocks 134 into aggregates, where each aggregate contains two or more blocks 134. For instance, aggregate 152 contains two blocks 134a and 134b. Other aggregates may contain three, four, or more blocks.

Compression manager 156 accesses aggregates arranged by aggregator 150 and performs data compression at per-aggregate granularity, meaning that it compresses each aggregate as a whole, without separately compressing individual blocks within each aggregate. SP 120 then stores compressed aggregates prepared by the compression manager 156 in the physical block layer 190. For instance, SP 120 stores a compressed version of aggregate 152 as compressed aggregate 192. SP 120 also performs necessary updates to the namespace 160, mapper 170, and virtual block layer 180, to establish proper mapping between logical addresses in the namespace 160 and corresponding physical addresses where the data of blocks 134 are represented in the physical block layer 190. These updates may include creating or adjusting pointers in pointer arrays 172 of the mapper 170 and creating or adjusting virtualization structures 182 in the virtual block layer 180.

With the pictured arrangement, the dedupe manager 140 is able to perform deduplication at block-level granularity, where the dedupe manager 140 can operate efficiently, while the compression manager 156 is able to perform data compression at aggregate-level granularity, where the compression manager 156 can also operate efficiently. The sizes of data on which the operations are performed are thus better suited to the respective operations than would be the case if the same data size were used for both operations. Overall storage efficiency is thereby improved.

In some examples, improvements in storage efficiency may be balanced against other system requirements, such as efficient reading of data. One consequence of compressing data in aggregates is that it requires the system to decompress multiple block's worth of data (the number of blocks in the aggregate) in order to read just one of the blocks. As will be described further below, the need to avoid excessive computational burdens when performing reads may impose an upper limit on the number of blocks that may be combined in any aggregate. In some examples, the upper limit may be established dynamically, based on various heuristics, so as to ensure that the improvements in storage efficiency do not come at too high a cost in terms of read throughput.

Figure 2:
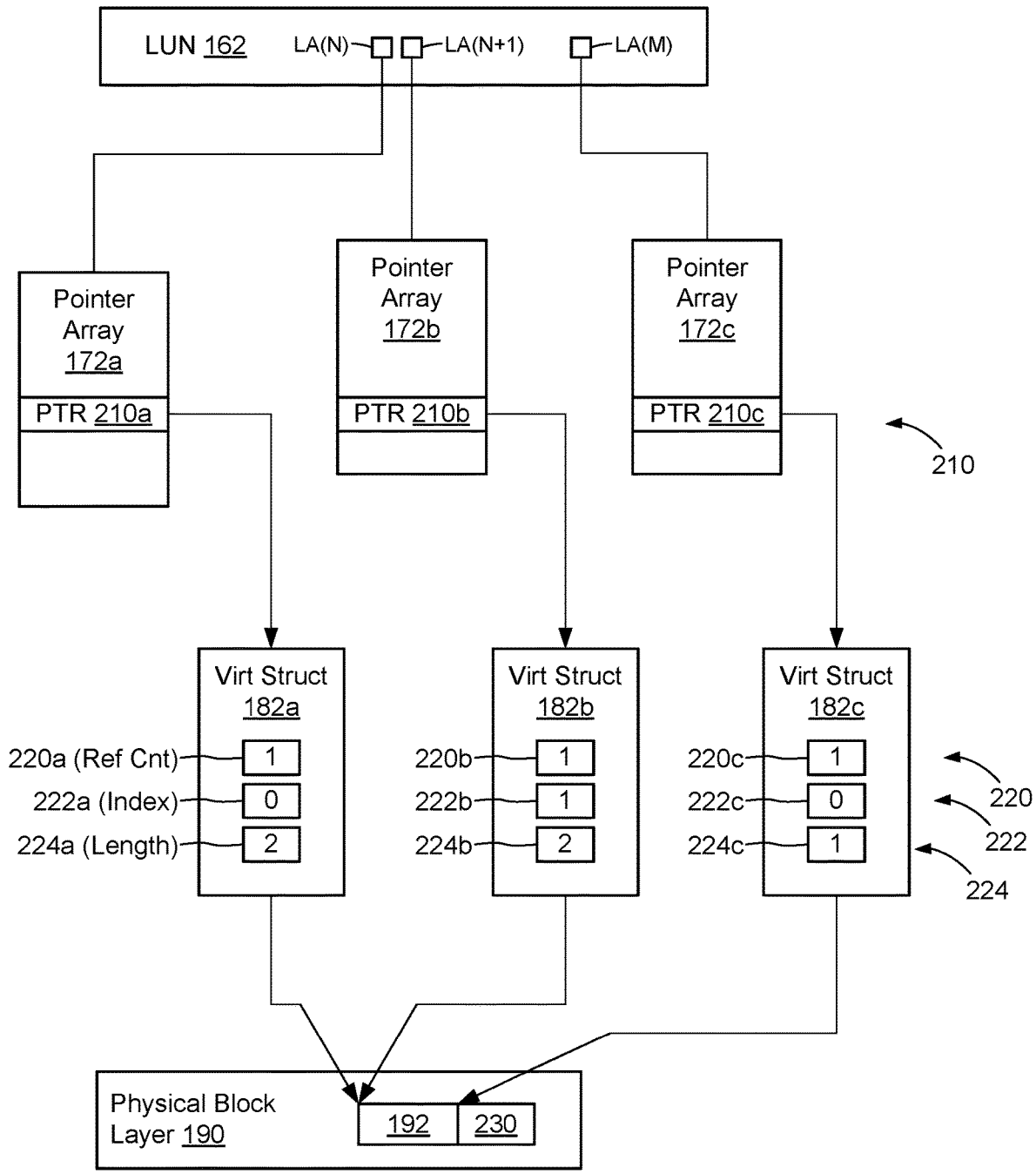
FIG. 2 is a block diagram of example mapping metadata structures used in the environment of FIG. 1.

FIG. 2 shows example metadata structures of FIG. 1 in greater detail. Here, LUN 162 in namespace 160 includes contiguous logical addresses LA(N) and LA(N+1), which may correspond to contiguous offsets into LUN 162. In this example, LA(N) maps to a stored version of block 134a, and LA(N+1) maps to a stored version of block 134b. LUN 162 is further seen to include a logical address LA(M), which corresponds to some other offset that is not contiguous with either LA(N) or LA(N+1). Pointer 210a in pointer array 172a in mapper 170 maps LA(N) to virtualization structure 182a in virtual block layer 180, and virtualization structure 182a further maps LA(N) to compressed aggregate 192 in physical block layer 190. Thus, the pictured metadata maps LA(N) to the compressed aggregate 192, which stores the compressed contents of block 134a. In a like manner, pointer 210b in pointer array 172b maps LA(N+1) to virtualization structure 182b, which maps to compressed aggregate 192, as well. Thus, both LA(N) and LA(N+1) map to compressed aggregate 192, which contains the contents of both blocks 134a and 134b, compressed together. As further shown, pointer 210c in pointer array 172c maps LA(M) to virtualization structure 182c, which maps to compressed data 230, which in this case is an individually compressed block.

Each virtualization structure 182 may include a reference count 220, which specifies a number of pointers 210 in the mapper 170 that points to the respective virtualization structure 182. Thus, virtualization structure 182a has a reference count 220a of "1," as only one pointer 210 (i.e., 210a) points to it. Likewise, each of virtualization structures 182b and 182c also has a reference count 220b or 220c of "1," as only one pointer 210b or 210c points to the respective structure. For simplicity, FIG. 2 shows only a single level of pointer arrays 172 (the leaf level), but one should appreciate that multiple levels may be present.

Tracking metadata within virtualization structures 182 support individual addressing of data blocks. The tracking metadata may include, for example, an index 222 and a length 224. Index 222 indicates a position of the addressed block within the compressed data. For example, index 220a has a value of "0," which indicates that the data corresponding to LA(N), i.e., that of block 134a, will be located in the initial position when aggregate 192 is decompressed. Likewise, index 220b has a value of "1," indicating that the data corresponding to LA(N+1), i.e., that of block 134b, will be located in the next position when aggregate 192 is decompressed. Given that data 230 is a single compressed block, index 220c is "0," as the data corresponding to LA(M) will be located in the zeroth (and only) position when data 230 is decompressed. Length 224 indicates the total number of blocks that have been compressed together in the pointed-to data. Thus, lengths 224a and 224b are both "2," as the pointed-to aggregate 192 includes two blocks 134a and 134b. However, length 224c in virtualization structure 182c is "1," as data 230 contains only a single block. Length values 224 may help to facilitate reads of compressed data, as the SP 120 merely needs to access the length 224 of a virtualization structure 182 to determine whether the compressed data is an aggregate or a single block.

Figure 3:
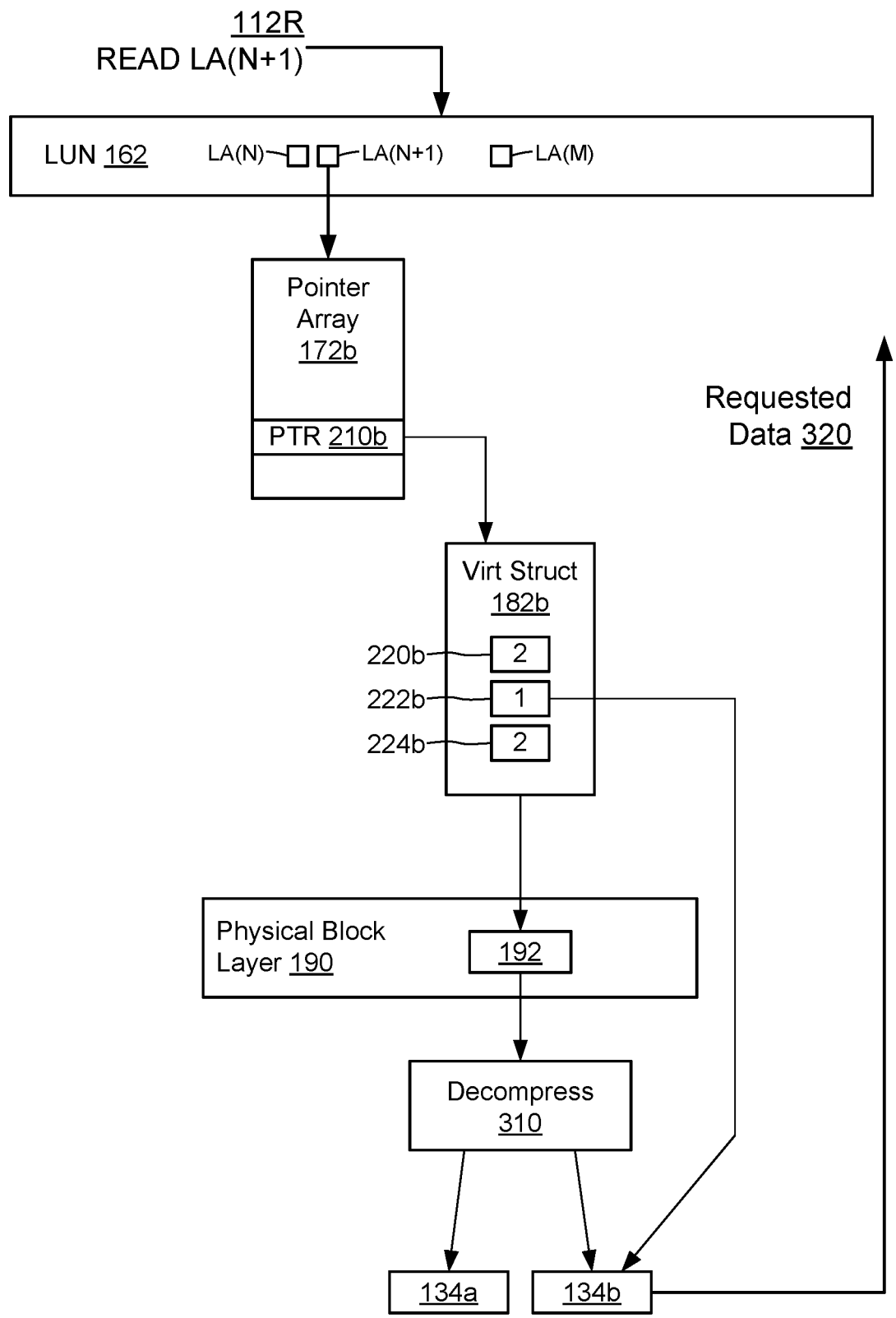
FIG. 3 is a block diagram of mapping metadata and operational structures involved in performing a read operation on data stored in a compressed aggregate.

FIG. 3 shows an example arrangement for responding to a read request, such as a read I/O request 112R received from a host 110. Some of the mapping structures of FIG. 2 are omitted for clarity. As shown, read request 112R specifies a read of LUN 162 at logical address LA(N+1), which corresponds to block 134b. In response to receipt of the read request 112R, SP 120 accesses pointer array 172b, i.e., the pointer array that maps LA(N+1), reads the pointer 210b, which corresponds to LA(N+1), follows the pointer 210b to virtualization structure 182b provided for block 134b, and reads the compressed aggregate 192 pointed to by virtualization structure 182b. SP 120 then performs decompression 310 on the compressed aggregate 192, thereby recovering the two blocks 134a and 134b. SP 120 reads the tracking metadata 222b (index) and 224b (length). As the index 222b is "1," SP 120 selects the recovered block 134b and returns the contents of the block 134b as requested data 320, thereby satisfying the read request 112R.

Figure 4:
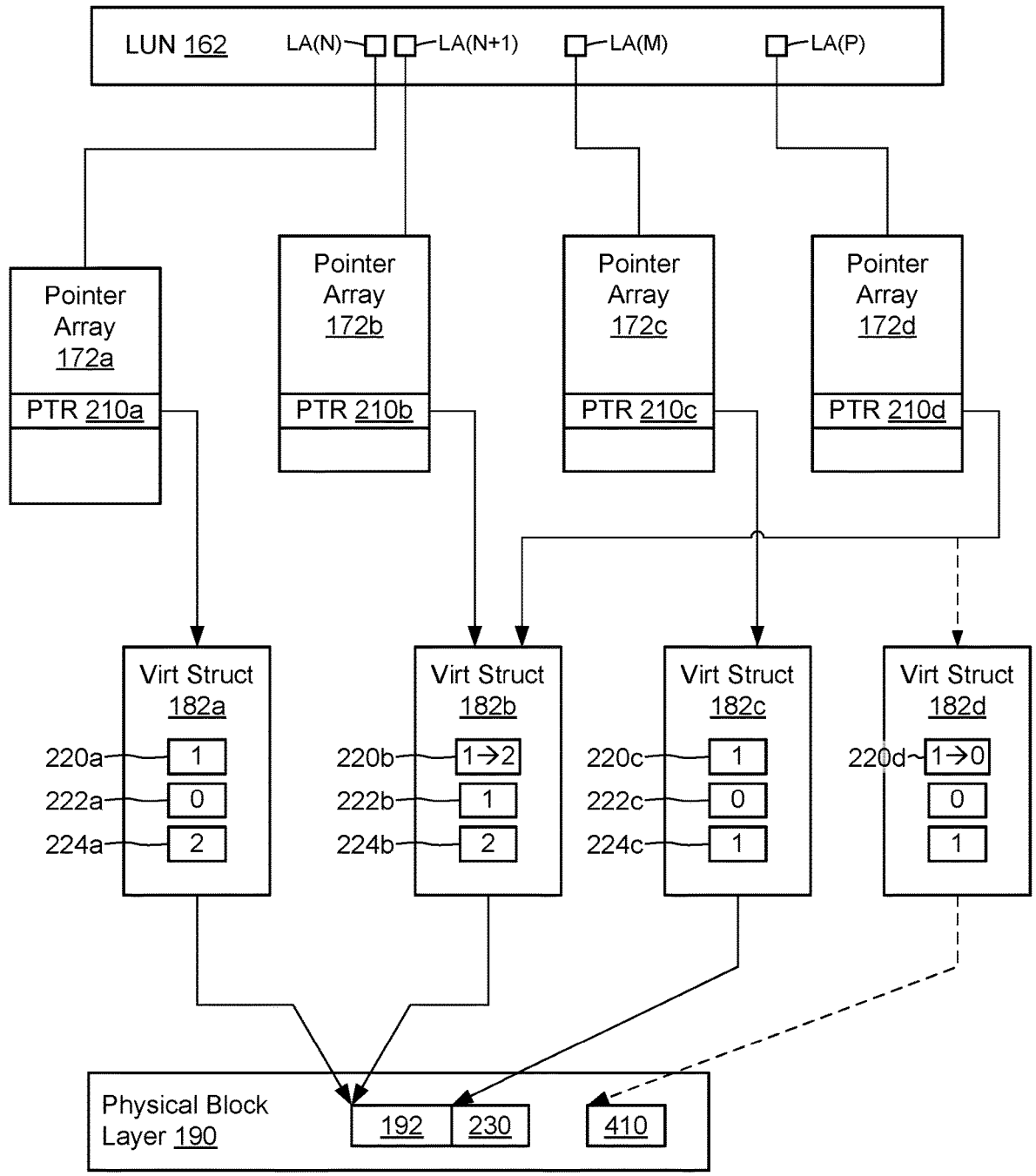
FIG. 4 is a block diagram of the mapping metadata structures of FIG. 2, after a deduplication operation has been performed.

FIG. 4 shows the same arrangement as in FIG. 2, but here a logical address LA(P) in LUN 162 is originally mapped to data 410, via pointer 210d in pointer array 172d and virtualization structure 182d. Data 410 has since been deduplicated, however, e.g., after dedupe manager 140 has found a match between the block represented by data 410 and the block 134b. As a result of deduplication, the pointer 210d has been adjusted to point to virtualization structure 182b, i.e., the same virtualization structure that already points to the data of block 134b. Reference count 220b is incremented from 1 to 2, as two pointers 210 now point to it. Likewise, reference count 220d in virtualization structure 182d is decremented from 1 to 0, as no pointers 210 now point to it. The space allocated for data 410 may be freed.

Figure 5:
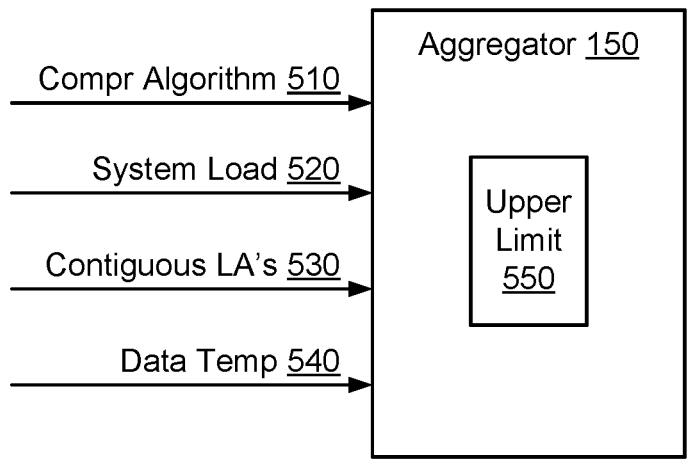
FIG. 5 is a block diagram of example features of an aggregator shown in FIG. 1.

FIG. 5 shows an example arrangement for operating the aggregator 150 of FIG. 1 in a manner that promotes overall efficiency. Here, the aggregator 150 maintains an upper limit 550 on the number of blocks 134 that are allowed to be grouped together in any given aggregate. Although compression efficiency may continue to increase as greater numbers of blocks 134 are grouped together, there may be a need to balance such gains in compression efficiency against additional burdens imposed when performing reads. For example, when reading one block from an aggregate, it is necessary to decompress the entire aggregate. If the number of blocks in an aggregate is large, response times to read requests may suffer, as many block's worth of data would need to be decompressed to return just a single block. Empirically, we have observed that limiting the size of an aggregate to 32 kB represents a good tradeoff between storage efficiency and read performance. At a 4-kB block size, 32 kB translates to eight blocks. Thus, as a rule of thumb, aggregator 150 may limit the number of blocks 134 grouped into any given aggregate to no more than eight.

In some examples, the upper limit 550 is dynamically adjustable and indeed may exceed eight blocks under certain conditions. The value of the upper limit 550 may be heuristically driven based on any of the following factors:

Compression Algorithm 510. The upper limit 550 may vary based on the particular compression algorithm being used, or based on whether software or hardware compression is being employed.

System Load 520. SP 120 may vary the upper limit 550 based upon busyness of the system, e.g., I/O's per second, throughput, or other performance measures. Under light loads, SP 120 may perform more aggressive compression that can accommodate larger numbers of blocks without imposing excessive decompression times. Under heavier load conditions, the SP may perform less aggressive compression and fewer blocks may be aggregated.

Contiguous Logical Addresses 530. There may be a tendency for contiguously written data to also be contiguously read. When reading contiguous data from a compressed aggregate, the burden of decompression becomes much less than when reading individual blocks, as the CPU cost of decompression may be amortized over the number of contiguous blocks. Thus, the upper limit 550 may assume a large number when the system is performing contiguous writes. Note that aggregator 150 may establish the upper limit 550 dynamically and in real time, by checking the logical addresses to which data blocks 134 in the cache 132 are being directed, grouping blocks into aggregates based on adjacency, and grouping more blocks together when it can establish long strings of contiguous data.

Data Temperature 540. It may be costly to group together large numbers of blocks when the blocks being grouped are "hot," meaning that they are frequently accessed, as CPU burdens experienced upon performing reads on hot data are more frequent and have greater effect. Conversely, CPU burdens are not so large when grouping blocks that are "cold" (infrequently accessed), as cold blocks are accessed rarely. Thus, by tracking the data temperature of particular blocks (or of larger storage units to which the blocks belong), the aggregator 150 can vary the upper limit 550, setting it to smaller values for hot data and to higher values for cold data.

One should appreciate that the aggregator 150 may apply the above factors in any combination, that fewer factors may be used, and that other factors may be used besides those shown. In addition, factors may be combined using rules-based logic, fuzzy logic, weighted sums, machine learning, neural nets, and the like.

Figure 6:
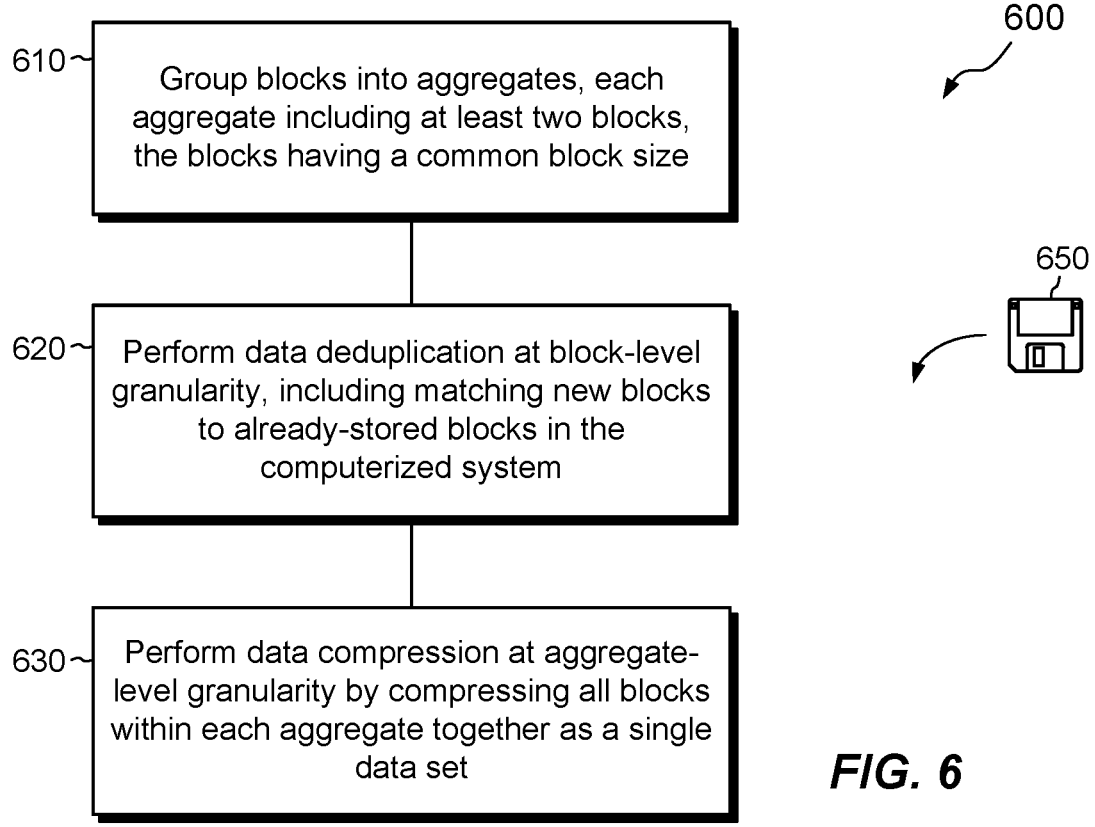
FIG. 6 is a flowchart showing an example method of managing data storage.

FIG. 6 shows an example method 600 that may be carried out in connection with the environment 100. The method 600 is typically performed, for example, by the software constructs described in connection with FIG. 1, which reside in the memory 130 of the storage processor 120 and are run by the set of processing units 124. The various acts of method 600 may be ordered in any suitable way. Accordingly, embodiments may be constructed in which acts are performed in orders different from that illustrated, which may include performing some acts simultaneously.

At 610, SP 120 groups blocks 134 into aggregates, each aggregate 152 including at least two blocks, the blocks 134 having a common block size, such as 4 kB, 8 kB, or the like.

At 620, SP 120 performs data deduplication at block-level granularity, including matching new blocks to already-stored blocks.

At 630, SP 120 performs data compression at aggregate-level granularity by compressing all blocks 132 within each aggregate 152 together as a single data set.

An improved technique has been described for promoting storage efficiency in a data storage system. The technique decouples data-set sizes used for compression from those used for deduplication, by performing deduplication at block-level granularity but performing compression on aggregates that contain multiple blocks. Advantageously, compression and deduplication can each work on data-set sizes that are more optimal for the respective features, avoiding the need to settle on a compromise that is not particularly well-suited to either of them. Higher levels of storage efficiency can thereby be achieved.

Having described certain embodiments, numerous alternative embodiments or variations can be made. For example, although certain mapping structures have been shown and described, these are merely examples, as other mapping structures may be used in their place. Likewise, although certain tracking metadata (index and length) have been described, these may also be varied, as there are numerous options for tracking locations of blocks within aggregates. Further, although the "blocks" on which deduplication operates have been described as allocation units of the data storage system 116, this is also merely an example. Alternatively, the data storage system 116 may allocate data in larger or smaller units, which may also be referred to as "blocks."

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data storage in a computerized system that stores data within blocks, the method comprising:
    grouping blocks into aggregates, each aggregate including at least two blocks, the blocks having a common block size;
    performing data deduplication at block-level granularity, including matching new blocks to already-stored blocks in the computerized system; and
    performing data compression at aggregate-level granularity by compressing all blocks within each aggregate together as a single data set,
    wherein the method further comprises providing access to the blocks using mapping metadata that includes (i) pointer arrays and (ii) virtualization structures, each pointer array including a respective set of pointers, each pointer pointing to a respective virtualization structure that points in turn to a respective block.

2. The method of claim 1 wherein performing data deduplication includes providing a digest database that relates digests of blocks to respective locations of those blocks in the computerized system, and wherein matching new blocks to already-stored blocks includes computing a digest of a new block and performing a lookup into the digest database for the computed digest.

3. The method of claim 1, wherein a virtualization structure that points to a particular block includes a pointer to a particular aggregate that includes the particular block, the particular block having been compressed as part of a data set that includes all blocks grouped together within the particular aggregate.

4. The method of claim 3, wherein the virtualization structure that points to the particular block includes tracking metadata that identifies the particular block within the particular aggregate.

5. The method of claim 4, wherein the tracking metadata includes an index and a length, the index identifying a position of the particular block among all of the blocks within the particular aggregate, the length indicating an uncompressed size of the particular aggregate.

6. The method of claim 5, wherein the uncompressed size of the particular aggregate in the tracking metadata is provided as an integer number of blocks.

7. The method of claim 4, further comprising enforcing an upper limit on a number of blocks that are grouped together in a single aggregate.

8. The method of claim 7, wherein the upper limit corresponds to 32 kB (kilobytes) per aggregate.

9. The method of claim 7, wherein the upper limit is adjustable dynamically based upon a load on the computerized system.

10. The method of claim 9, wherein the upper limit is further adjustable dynamically based upon at least one of the following:
    a compression algorithm used to compress aggregates; and
    whether blocks stored within an aggregate correspond to logically contiguous data.

11. The method of claim 4, wherein grouping blocks into aggregates includes placing a set of blocks having contiguous logical offsets into contiguous positions within an aggregate.

12. The method of claim 4, further comprising responding to a read request directed to a specified logical address of the particular block by:
    accessing a pointer array that maps the specified logical address;
    following a pointer in the accessed pointer array to the virtualization structure provided for the particular block;
    reading the particular aggregate pointed to by the virtualization structure;
    decompressing the particular aggregate;
    applying the tracking metadata within the virtualization structure to locate the particular block within the particular aggregate; and
    returning the particular block to satisfy the read request.

13. The method of claim 4, wherein the digest database stores the respective locations of the blocks by identifying virtualization structures that point to the respective blocks in the computerized system.

14. The method of claim 13, further comprising providing a reference count for the virtualization structure that points to the particular block, the reference count tracking a number of pointers in the pointer arrays that point to the virtualization structure based at least in part on having performed deduplication to the particular block.

15. A computerized system, comprising control circuitry that includes a set of processing units coupled to memory, the control circuitry constructed and arranged to:
    group blocks into aggregates, each aggregate including at least two blocks, the blocks having a common block size;
    perform data deduplication at block-level granularity, including matching new blocks to already-stored blocks in the computerized system; and
    perform data compression at aggregate-level granularity by compressing all blocks within each aggregate together as a single data set,
    wherein the control circuitry is further constructed and arranged to provide access to the blocks using mapping metadata that includes (i) pointer arrays and (ii) virtualization structures, each pointer array including a respective set of pointers, each pointer pointing to a respective virtualization structure that points in turn to a respective block.

16. A computer program product including a set of non-transitory, computer-readable media having instructions which, when executed by control circuitry of a computerized system, cause the control circuitry to perform a method of managing data storage, the method comprising:
    grouping blocks into aggregates, each aggregate including at least two blocks, the blocks having a common block size;
    performing data deduplication at block-level granularity, including matching new blocks to already-stored blocks in the computerized system; and
    performing data compression at aggregate-level granularity by compressing all blocks within each aggregate together as a single data set,
    wherein the method further comprises providing access to the blocks using mapping metadata that includes (i) pointer arrays and (ii) virtualization structures, each pointer array including a respective set of pointers, each pointer pointing to a respective virtualization structure that points in turn to a respective block.

17. The computer program product of claim 16,
    wherein a virtualization structure that points to a particular block includes a pointer to a particular aggregate that includes the particular block, the particular block having been compressed as part of a data set that includes all blocks grouped together within the particular aggregate.

18. The computer program product of claim 17, wherein the virtualization structure that points to the particular block includes tracking metadata that identifies the particular block within the particular aggregate.

19. The computer program product of claim 16, further comprising enforcing an upper limit on a number of blocks that are grouped together in a single aggregate.

* * * * *